(12) United States Patent
Hiro et al.

(10) Patent No.: US 10,645,295 B2
(45) Date of Patent: May 5, 2020

(54) IMAGING CONTROL APPARATUS, IMAGING CONTROL METHOD, AND COMPUTER PROGRAM

(71) Applicant: Sony Corporation, Tokyo (JP)

(72) Inventors: Daisuke Hiro, Kanagawa (JP); Ayako Iwase, Kanagawa (JP); Lyo Takaoka, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/779,180

(22) PCT Filed: Nov. 22, 2016

(86) PCT No.: PCT/JP2016/084654
§ 371 (c)(1),
(2) Date: May 25, 2018

(87) PCT Pub. No.: WO2017/126216
PCT Pub. Date: Jul. 27, 2017

(65) Prior Publication Data
US 2018/0359425 A1    Dec. 13, 2018

(30) Foreign Application Priority Data

Jan. 19, 2016   (JP) .................. 2016-007771

(51) Int. Cl.
*H04N 5/232* (2006.01)
*G03B 7/00* (2014.01)
(Continued)

(52) U.S. Cl.
CPC ....... *H04N 5/232939* (2018.08); *G03B 7/003* (2013.01); *G03B 17/18* (2013.01);
(Continued)

(58) Field of Classification Search
CPC .. H04N 5/232939; H04N 5/235; H04N 5/225; H04N 5/232935; H04N 5/2353; G03B 7/003; G03B 17/18
See application file for complete search history.

(56) References Cited

U.S. PATENT DOCUMENTS

2010/0296806 A1\* 11/2010 Seo ................. G03B 7/003
396/236
2011/0050923 A1\* 3/2011 Nomura ............ G03B 7/097
348/208.99

FOREIGN PATENT DOCUMENTS

JP    05-019328 A    1/1993
JP    11-242255 A    9/1999
(Continued)

*Primary Examiner* — Ahmed A Berhan
(74) *Attorney, Agent, or Firm* — Michael Best & Friedrich LLP

(57) ABSTRACT

[Object] To provide an imaging control apparatus that enables a parameter that complies with the intention of a user, to be automatically set at the time of image capturing. [Solution] Provided is an imaging control apparatus including: a control unit configured to change a display that consecutively describes a relationship between parameters of two or more image capturing conditions, in accordance with an operation performed by a user, and to change a setting of the relationship in accordance with a change of the display. With this configuration, the imaging control apparatus enables a parameter that complies with the intention of a user, to be automatically set at the time of image capturing.

17 Claims, 9 Drawing Sheets

(51) Int. Cl.
*H04N 5/235* (2006.01)
*G03B 17/18* (2006.01)

(52) U.S. Cl.
CPC ........... *H04N 5/232* (2013.01); *H04N 5/2353* (2013.01); *H04N 5/232933* (2018.08); *H04N 5/232935* (2018.08)

(56) References Cited

FOREIGN PATENT DOCUMENTS

| | | |
|---|---|---|
| JP | 2005-173610 A | 6/2005 |
| JP | 2006-178015 A | 7/2006 |
| JP | 2007-019962 A | 1/2007 |
| JP | 2011-070175 A | 4/2011 |
| JP | 2011-197090 A | 10/2011 |

\* cited by examiner

IMAGING CONTROL APPARATUS, IMAGING CONTROL METHOD, AND COMPUTER PROGRAM

TECHNICAL FIELD

The present disclosure relates to an imaging control apparatus, an imaging control method, and a computer program.

BACKGROUND ART

Even for professional cameramen or high-level amateur users who are accustomed to image capturing using cameras, it is not so often to manually set all parameters of image capturing conditions such as a shutter speed, an aperture, and an ISO sensitivity. In many cases, such cameramen or users cause cameras to automatically perform settings of some sort. When a camera is caused to automatically perform settings, a camera side automatically decides a parameter of an image capturing condition without causing failures in an image capturing result.

When a camera automatically decides parameters, the camera uses a program chart. The program chart is a graph that describes a relationship between a shutter speed and an aperture that are for obtaining adequate exposure. In addition, examples of technologies related to the parameter setting of image capturing conditions that uses a program chart include Patent Literatures 1 to 3, and the like.

CITATION LIST

Patent Literature

Patent Literature 1: JP 2006-178015A
Patent Literature 2: JP 2007-019962A
Patent Literature 3: JP H11-242255A

DISCLOSURE OF INVENTION

Technical Problem

Nevertheless, existing technologies can only select a program chart prepared in advance within a given range, or acquire values of one or more points from a program chart given in advance, and cannot automatically set a parameter that complies with the intention of a user.

In view of the foregoing, the present disclosure proposes an imaging control apparatus, an imaging control method, and a computer program that are novel and improved, and enable a parameter that complies with the intention of a user, to be automatically set at the time of image capturing.

Solution to Problem

According to the present disclosure, there is provided an imaging control apparatus including: a control unit configured to change a display that consecutively describes a relationship between parameters of two or more image capturing conditions, in accordance with an operation performed by a user, and to change a setting of the relationship in accordance with a change of the display.

In addition, according to the present disclosure, there is provided an imaging control method including: changing a display that consecutively describes a relationship between parameters of two or more image capturing conditions, in accordance with an operation performed by a user, and changing a setting of the relationship in accordance with a change of the display.

In addition, according to the present disclosure, there is provided a computer program for causing a computer to execute: changing a display that consecutively describes a relationship between parameters of two or more image capturing conditions, in accordance with an operation performed by a user, and changing a setting of the relationship in accordance with a change of the display.

Advantageous Effects of Invention

As described above, according to the present disclosure, an imaging control apparatus, an imaging control method, and a computer program that are novel and improved, and enable a parameter that complies with the intention of a user, to be automatically set at the time of image capturing can be provided.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
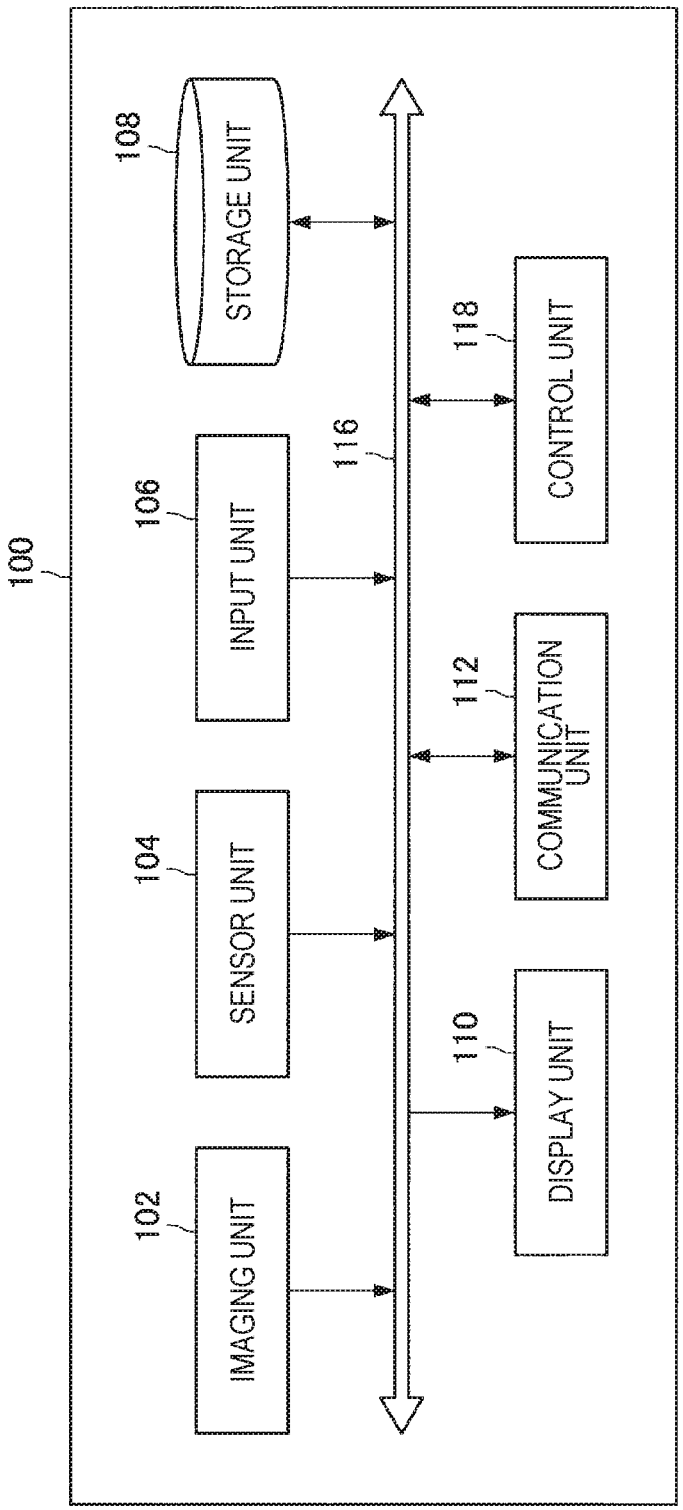
FIG. 1 is a block diagram illustrating a configuration example of an image processing apparatus 100 according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.
1. Embodiment of Present Disclosure
   1.1. Background
   1.2. Functional Configuration Example
   1.3. Operation Example 2. Conclusion <1. Embodiment of Present Disclosure>

[1.1. Background]

First of all, a background of an embodiment of the present disclosure will be described.

As mentioned above, even for professional cameramen or high-level amateur users who are accustomed to image capturing using cameras, it is not so often to manually set all parameters of image capturing conditions such as a shutter speed, an aperture, and an ISO sensitivity. In many cases, such cameramen or users cause cameras to automatically perform settings of some sort. When a camera is caused to automatically perform settings, a camera side automatically decides a parameter of an image capturing condition without causing failures in an image capturing result. When a camera automatically decides parameters, the camera uses a graph called a program chart. The program chart is a graph that consecutively describes a relationship between two or more image capturing conditions parameters (e.g., shutter speed and aperture) that are for obtaining adequate exposure.

Existing cameras have been able to select a program chart prepared in advance within a given range, or acquire values of one or more points from a program chart given in advance. Nevertheless, the existing technologies cannot automatically set a parameter that complies with the intention of a user. For example, even if a negative effect is allowed to be given on an image capturing result by a setting value desired to be used by a user, a setting value exceeding a given range cannot be used. In addition, in a case where a change in situation is involved, a setting value does not consecutively change to a setting value that is close to the intention of the user itself.

For example, in some cases, an image of a subject quickly moving in a dark place is captured. In such cases, a user can possibly demand to use a setting value exceeding a range given to automatic setting, with the understanding that an image capturing result may be affected depending on the situations, or to use a setting value that is close to the intention as far as possible even in the automatic setting. Nevertheless, with the existing automatic setting, image capturing cannot be performed using a setting that can meet such demand of the user.

As mentioned above, examples of technologies related to the parameter setting of image capturing conditions that uses a program chart include Patent Literatures 1 to 3, and the like. Nevertheless, all of the existing technologies merely select a program chart prepared in advance within a given range, or acquire values of one or more points from a program chart given in advance, and cannot automatically set a parameter that complies with the intention of the user. In the existing technologies, even if a negative effect, such as an increase in noise, is allowed to be given in the automatic setting on an image capturing result by a setting value desired to be used by a user, a setting value exceeding a given range cannot be used. In addition, in the existing technologies, in a case where a change in situation is involved, a setting value does not consecutively change to a setting value that is close to the intention of the user itself.

Thus, in view of the aforementioned background, the disclosing party of the present application earnestly studied a technology enabling a parameter that complies with the intention of a user, to be automatically set at the time of image capturing. As a result, the disclosing party of the present application has eventually devised a technology enabling a parameter that complies with the intention of a user, to be automatically set at the time of image capturing, by changing a parameter defined in a program chart, in accordance with an operation of a user.

The background of the embodiment of the present disclosure has been described above. Subsequently, the embodiment of the present disclosure will be described in detail.

[1.2. Configuration Example]

First of all, a configuration example of an image processing apparatus 100 according to the embodiment of the present disclosure will be described. FIG. 1 is a block diagram illustrating a configuration example of the image processing apparatus 100 according to the embodiment of the present disclosure. The configuration example of the image processing apparatus 100 according to the embodiment of the present disclosure will be described below using FIG. 1.

As illustrated in FIG. 1, the image processing apparatus 100 according to the embodiment of the present disclosure includes an imaging unit 102, a sensor unit 104, an input unit 106, a storage unit 108, a display unit 110, a communication unit 112, a bus 116, and a control unit 118.

(1) Imaging Unit

The imaging unit 102 is a camera module that includes a zoom lens, a focusing lens, an image sensor, and the like, and captures an image. The imaging unit 102 captures an image of a real space using an image sensor such as a charge coupled device (CCD) or a complementary metal oxide semiconductor (CMOS), to generate a captured image. A series of captured images generated by the imaging unit 102 constitutes a video showing the real space. Note that the imaging unit 102 needs not be always a part of the image processing apparatus 100. For example, an imaging apparatus connected to the image processing apparatus 100 in a wired or wireless manner may be treated as the imaging unit 102. In addition, the zoom lens and the focusing lens in the imaging unit 102 may be provided so as to be detachable from the image processing apparatus 100.

(2) Sensor Unit

The sensor unit 104 can include various sensors such as a positioning sensor, an acceleration sensor, a gyro sensor, a geomagnetic sensor, an illuminance sensor, a temperature sensor, or a barometric sensor. A position, an attitude, or a motion of the image processing apparatus 100 that can be measured by the sensor unit 104 may be used for various purposes such as support for recognition of the position and the attitude of a camera, acquisition of data specialized for a geographical position, or recognition of an instruction from the user. Note that the sensor unit 104 may be omitted from the configuration of the image processing apparatus 100.

Specifically, examples of the positioning sensor can include a global navigation satellite system (GNSS) receiver, and/or a communication device, and the like. Examples of the GNSS can include the Global Positioning System (GPS), the Global Navigation Satellite System (GLONASS), the BeiDou Navigation Satellite System (BDS), a Quasi-Zenith Satellites System (QZSS), the Galileo, and the like. In addition, examples of the positioning sensor can include sensors that detect positions using technologies such as a wireless local area network (LAN), Multi-Input Multi-Output (MIMO), cellular communication (e.g. position detection that uses a portable base station, femtocell), Near Field Communication (e.g., Bluetooth Low Energy (BLE). Bluetooth (registered trademark)), or the like.

(3) Input Unit

The input unit 106 is an input device used by the user for operating the image processing apparatus 100 or inputting information to the image processing apparatus 100. For example, the input unit 106 may include a touch sensor that detects a touch performed by the user on a screen of the display unit 110. The touch sensor can desirably detect touches at two or more points, but is not limited to a touch sensor that can detect touches at two or more points. In place of this (or in addition to this), the input unit 106 may include a pointing device such as a mouse or a touch pad. Furthermore, the input unit 106 may include an input device of another type, such as a keyboard, a keypad, a button, or a switch.

(4) Storage Unit

The storage unit 108 includes a storage medium such as a semiconductor memory or a hard disc, and stores programs and data for processing performed by the image processing apparatus 100. For example, data stored by the storage unit 108 can include captured image data, sensor data, and data of a program chart, which will be described later. Note that a part of the programs and data described in this specification may be acquired from an external data source (e.g., data server, network storage, an external memory, or the like), without being stored in the storage unit 108.

(5) Display Unit

The display unit 110 is a display module including a display such as a liquid crystal display (LCD) or an organic light-emitting diode (OLED). For example, the display unit 110 is used for displaying an output image generated by the image processing apparatus 100. Note that the display unit 110 also needs not be always a part of the image processing apparatus 100. For example, a display device connected to the image processing apparatus 100 in a wired or wireless manner may be treated as the display unit 110.

(6) Communication Unit

The communication unit 112 is a communication interface that mediates communication performed by the image processing apparatus 100 with another apparatus. The communication unit 112 supports an arbitrary wireless communication protocol or wired communication protocol, and establishes communication connection with another apparatus.

(7) Bus

The bus 116 connects the imaging unit 102, the sensor unit 104, the input unit 106, the storage unit 108, the display unit 110, the communication unit 112, and the control unit 118 to one another.

(8) Control Unit

The control unit 118 corresponds to a processor such as a central processing unit (CPU) or a digital signal processor (DSP). By executing programs stored in the storage unit 108 or another storage medium, the control unit 118 operates various functions of the image processing apparatus 100, which will be described later.

In the present embodiment, in accordance with a predetermined operation performed by the user, the control unit 118 displays, on the display unit 110, a program chart that consecutively describes, in a linear shape, a relationship between two or more image capturing conditions parameters (e.g., shutter speed and aperture). Then, in accordance with the predetermined operation performed by the user, the control unit 118 visually changes a setting of the program chart displayed on the display unit 110. By the control unit 118 visually changing the setting of the program chart displayed on the display unit 110, in accordance with the predetermined operation performed by the user, it becomes possible for the image processing apparatus 100 to cause a parameter that complies with the intention of the user, to be automatically set at the time of image capturing.

The configuration example of the image processing apparatus 100 according to the embodiment of the present disclosure has been described above. Subsequently, an operation example of the image processing apparatus 100 according to the embodiment of the present disclosure will be described.

[1.3. Operation Example]

Figure 2:
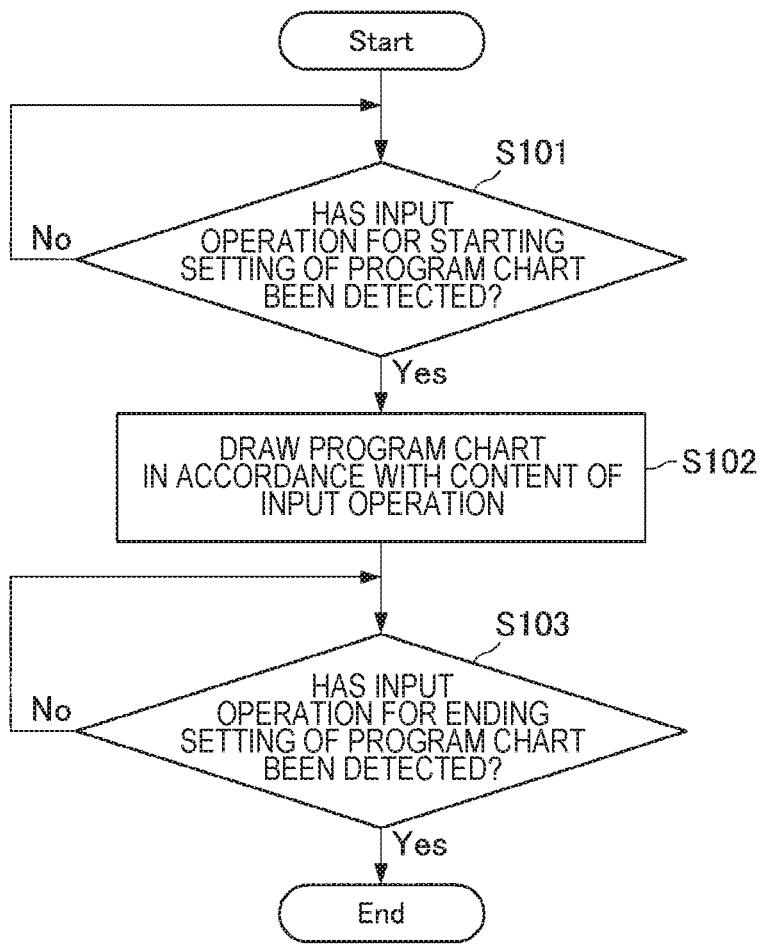
FIG. 2 is a flow chart illustrating an operation example of the image processing apparatus 100 according to the embodiment of the present disclosure.

FIG. 2 is a flow chart illustrating an operation example of the image processing apparatus 100 according to the embodiment of the present disclosure. FIG. 2 illustrates the image processing apparatus 100 in visually changing the setting of the program chart displayed on the display unit 110, in accordance with a predetermined operation performed by the user. The operation example of the image processing apparatus 100 according to the embodiment of the present disclosure will be described below using FIG. 2.

The image processing apparatus 100 waits until an input operation for starting the setting of the program chart that is performed by the user using the input unit 106 is detected (step S101). The control unit 118 performs the detection of the input operation.

For example, from a setting screen of the image processing apparatus 100 that is displayed on the display unit 110, the image processing apparatus 100 may display the program chart on the display unit 110 in accordance with a predetermined input operation of the user that is performed using the input unit 106, and transition to a screen for causing the user to change the setting of the program chart. In addition, the image processing apparatus 100 may recognize a predetermined gesture of the user that is performed on a touch panel provided on the display unit 110, display the program chart on the display unit 110, and transition to the screen for causing the user to change the setting of the program chart. After transitioning to the screen for causing the user to change the setting of the program chart, the image processing apparatus 100 enters a state of accepting an input operation for changing the setting of the program chart.

When the input operation for starting the setting of the program chart that is performed by the user using the input unit 106 is detected (step S101, Yes), the image processing apparatus 100 draws the program chart on the display unit 110 in accordance with the input operation for starting the setting of the program chart that is performed by the user using the input unit 106 (step S102). The control unit 118 performs the detection of the input operation for starting the setting of the program chart that is performed using the input unit 106, and the drawing onto a drawing onto the display unit 110 of the program chart that is performed in accordance with the input operation.

Then, the image processing apparatus 100 waits until an input operation for ending the setting of the program chart that is performed by the user using the input unit 106 is detected (step S103). When the input operation for ending the setting of the program chart that is performed by the user using the input unit 106 is detected (step S103, Yes), the image processing apparatus 100 ends the setting of the program chart that is performed in accordance with the input operation of the user.

The operation example of the image processing apparatus 100 according to the embodiment of the present disclosure has been described above using FIG. 2. Subsequently, a specific example of the setting of the program chart that is performed by the image processing apparatus 100 will be described in detail.

Figure 3:
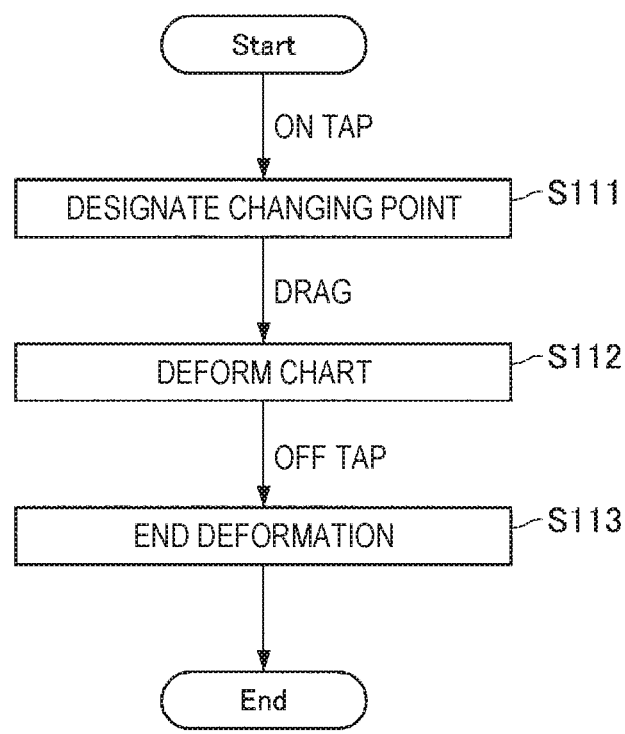
FIG. 3 is a flow chart illustrating an operation example of the image processing apparatus 100 according to the embodiment of the present disclosure.

FIG. 3 is a flow chart illustrating an operation example of the image processing apparatus 100 according to the embodiment of the present disclosure. FIG. 3 illustrates an operation example of the image processing apparatus 100 in performing the setting of the program chart in accordance with an input operation of the user.

When the image processing apparatus 100 detects that the user has performed a predetermined operation of performing the designation of a changing point of the program chart (e.g., touching or approaching of a finger or the like to the display unit 110) (step S111), the image processing apparatus 100 sets the changing point of the program chart that the user intends to set. The control unit 118 can execute the detection of the operation and the setting of the changing point.

Figure 4:
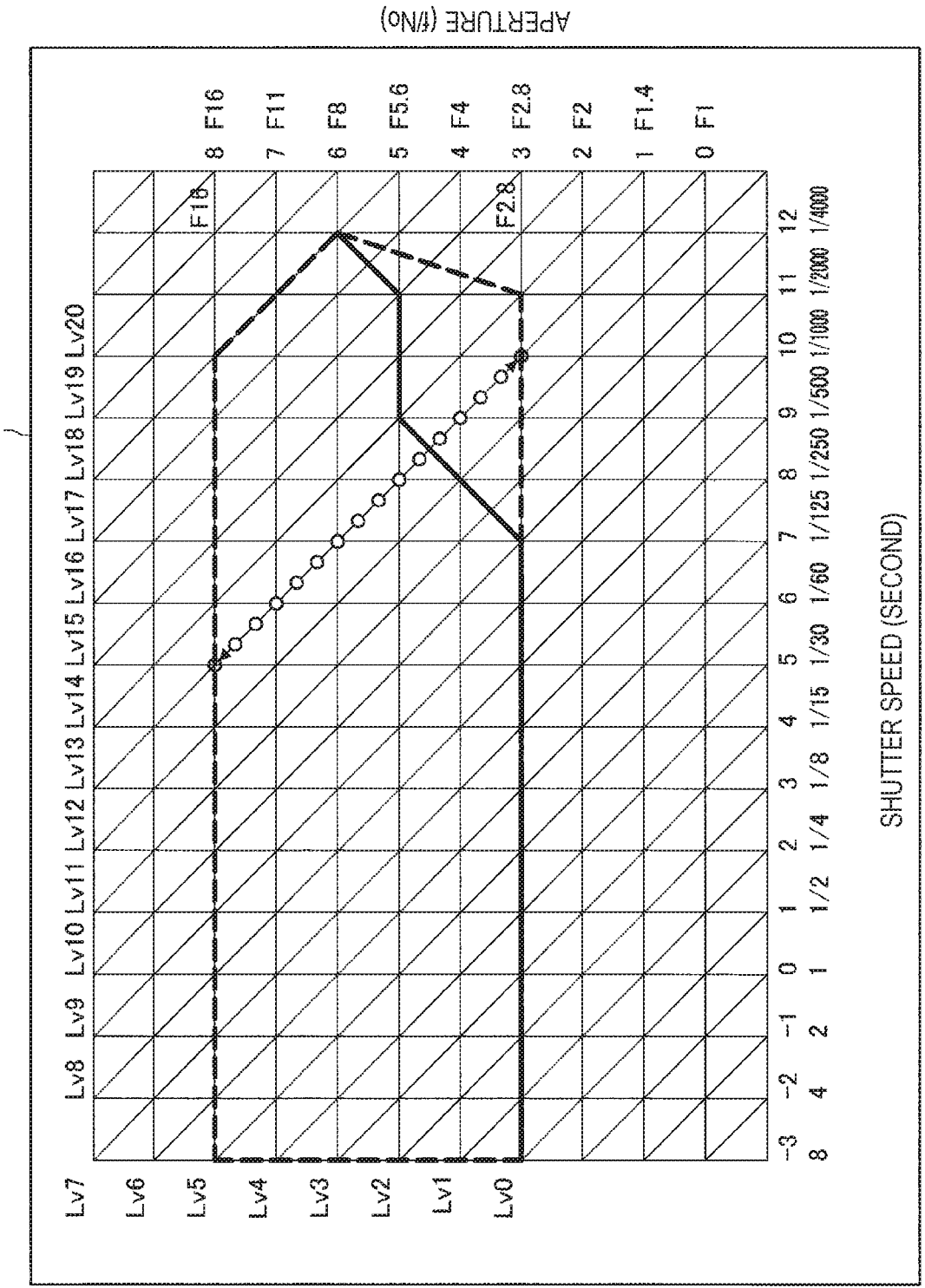
FIG. 4 is an explanatory diagram illustrating an example of a screen displayed on a display unit 110.

FIG. 4 is an explanatory diagram illustrating an example of a screen displayed on the display unit 110 of the image processing apparatus 100. FIG. 4 illustrates a state in which a program chart being a setting change target is displayed on the display unit 110 in accordance with a predetermined input operation of the user that is performed using the input unit 106. The program chart illustrated in FIG. 4 is a program chart obtainable in a case where a predetermined ISO sensitivity (e.g., ISO sensitivity is 100) is set. The program chart being a setting change target may be the one preset in the image processing apparatus 100, or may be the one set by the user.

For changing the setting of the program chart displayed on the display unit 110, the user designates a changing point of the program chart displayed on the display unit 110, using a finger or the like. For example, in the program chart illustrated in FIG. 4, a setting is made such that an aperture cannot be opened more than F5.6 in a case where a shutter speed is 1/500 seconds. In a case where a user considers that the setting is desired to be made such that an aperture is opened more in a case where a shutter speed is 1/500, or the setting of stopping down more is desired to be made, the user touches, with a finger, a point with the shutter speed 1/500 seconds and the aperture F5.6. When the control unit 118 detects that the user has touched, with a finger, the point with the shutter speed 1/500 seconds and the aperture F5.6, the control unit 118 sets the point as a changing point of the program chart.

Figure 5:
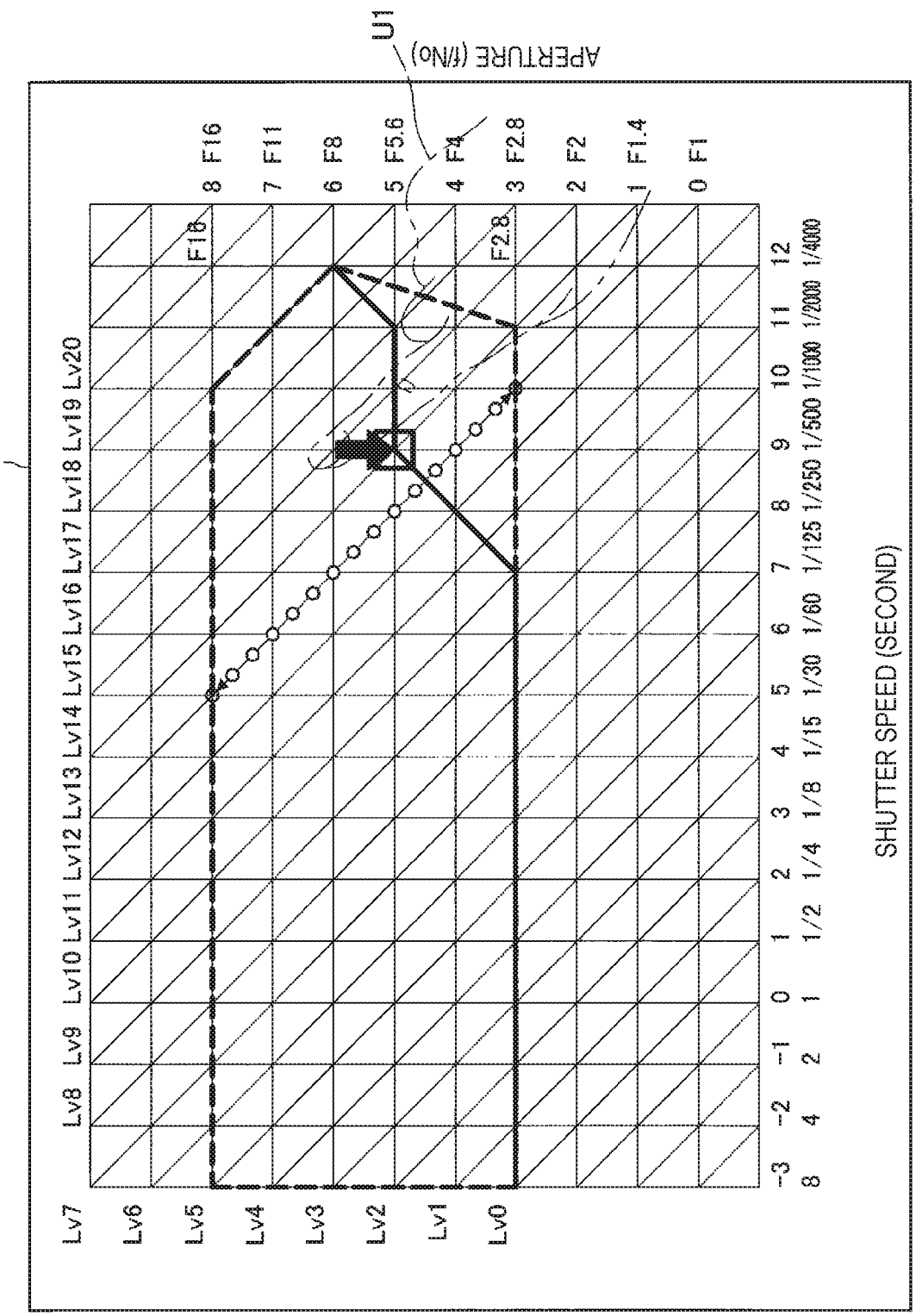
FIG. 5 is an explanatory diagram illustrating an example of a screen displayed on the display unit 110.

FIG. 5 is an explanatory diagram illustrating a state in which the user performs an operation of designating a changing point of the program chart. FIG. 5 is an explanatory diagram illustrating a state in which a finger of a hand U1 of the user touches one point (the point with the shutter speed 1/500 seconds and the aperture F5.6) on the display unit 110 as a predetermined operation of performing the designation of a changing point of the program chart. When the control unit 118 detects that the finger of the hand U1 of the user has touched the one point of the display unit 110, the control unit 118 sets the position touched by the finger of the hand U1 of the user, as the changing point of the program chart.

Subsequently, when the image processing apparatus 100 detects that the user has performed a predetermined operation of performing a change of the setting of the program chart (e.g., drag operation from the position of the changing point of the program chart that is performed onto the display unit 110) (step S112), the image processing apparatus 100 changes the setting of the program chart in accordance with the operation of the user, and displays the changed program chart on the display unit 110.

Figure 6:
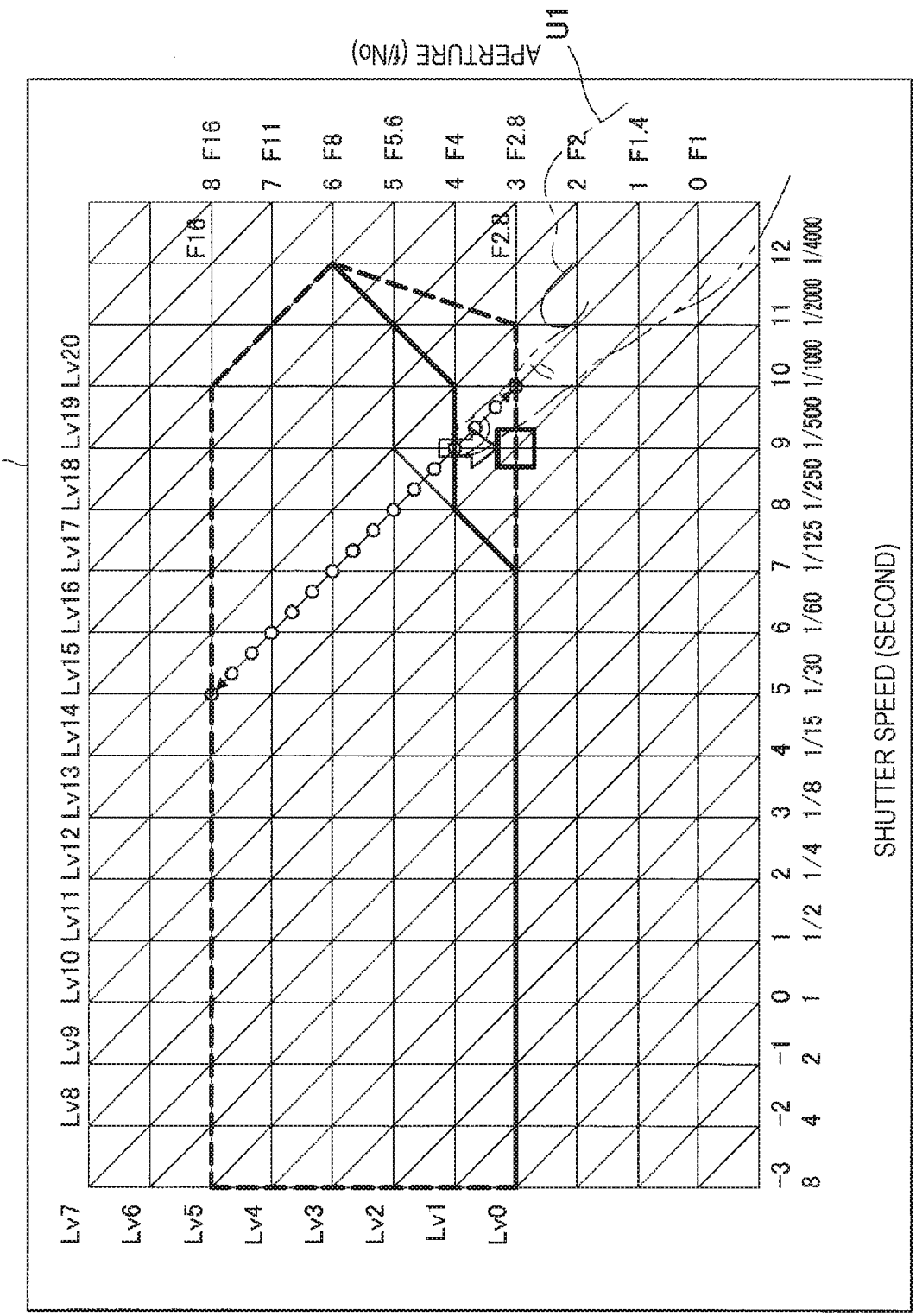
FIG. 6 is an explanatory diagram illustrating an example of a screen displayed on the display unit 110.

FIG. 6 is an explanatory diagram illustrating a state in which the user performs an operation of changing the setting of the program chart. FIG. 6 is an explanatory diagram of a state in which a drag operation of the finger of the hand U1 of the user from the position illustrated in FIG. 5 is being performed as an operation of changing the setting of the program chart. When the control unit 118 detects that the user is performing a drag operation, the control unit 118 draws the setting of the program chart on the display unit 110 in accordance with the drag operation.

FIG. 6 illustrates a state in which the user is performing a drag operation of the finger of the hand U1 in a direction in which the aperture is opened from the point with the shutter speed 1/500 seconds and the aperture F5.6. When the user drags the finger of the hand U1, the control unit 118 draws the setting of the program chart on the display unit 110 in accordance with the drag operation.

Then, when the image processing apparatus 100 detects that the user has performed a predetermined operation of ending the change of the setting of the program chart (e.g., release of touching or approaching of a finger or the like to the display unit 110) (step S113), the image processing apparatus 100 ends the change of the setting of the program chart. The control unit 118 can execute the detection of the predetermined operation of ending the change of the setting of the program chart.

Figure 7:
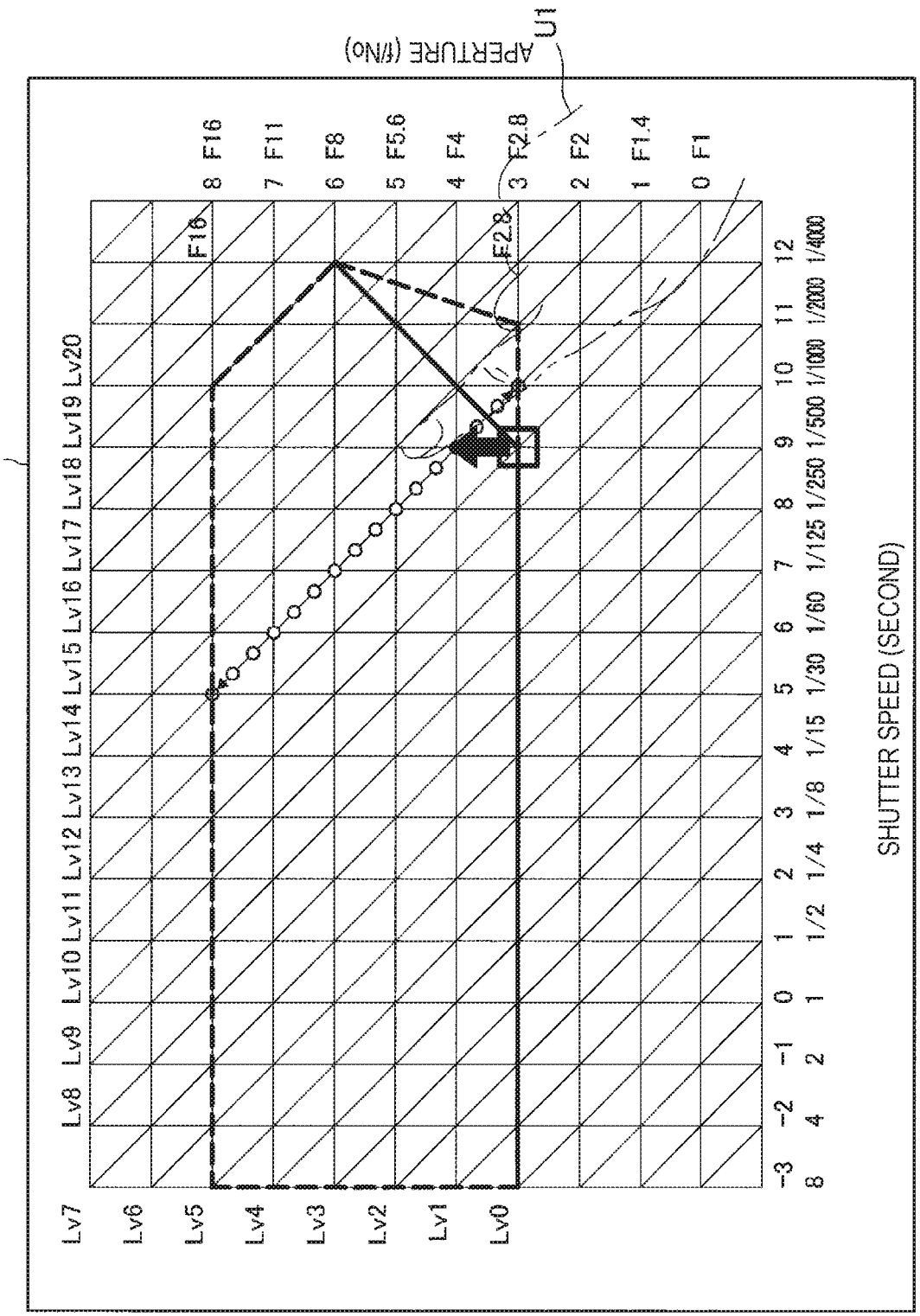
FIG. 7 is an explanatory diagram illustrating an example of a screen displayed on the display unit 110.

FIG. 7 is an explanatory diagram illustrating a state in which the user performs an operation of ending the change of the setting of the program chart. FIG. 7 is an explanatory diagram illustrating a state in which the finger of the hand U1 of the user gets separated from the display unit 110 as a predetermined operation of ending the change of the setting of the program chart. When the control unit 118 detects that the finger of the hand U1 of the user has got separated from the display unit 110, the control unit 118 ends the change of the setting of the program chart. In the example illustrated in FIG. 7, by the drag operation of the user, the setting of the program chart is changed to a setting in which the aperture can be opened up to an aperture F2.8 even in a case where the shutter speed is 1/500 seconds.

When the image processing apparatus 100 detects in step S113 described above that the user has performed the predetermined operation of ending the change of the setting of the program chart, the image processing apparatus 100 may automatically store, into the storage unit 108, the content of the program chart having the changed setting, or may store the content into the storage unit 108 in response to the user performing a predetermined operation for saving the content of the program chart.

By visually changing the setting of the program chart in accordance with an operation of the user, in this manner, it becomes possible for the image processing apparatus 100 to perform image capturing using a shutter speed and an aperture that exceed a predefined range depending on the setting. In addition, by visually changing the setting of the program chart in accordance with an operation of the user, the image processing apparatus 100 can present the changed setting to the user in an easily understood manner. In addition, by the image processing apparatus 100 visually changing the setting of the program chart in accordance with an operation of the user, the user can expect an effect of predicting a changed operation more easily.

In the aforementioned description, an example in which the user changes the setting of the program chart using a finger as an example of an operation member has been illustrated. Nevertheless, the present disclosure is not limited to this example. The image processing apparatus 100 may accept a change of the setting of the program chart that is performed using a device such as a stylus, instead of a part of a body of the user.

Figure 8:
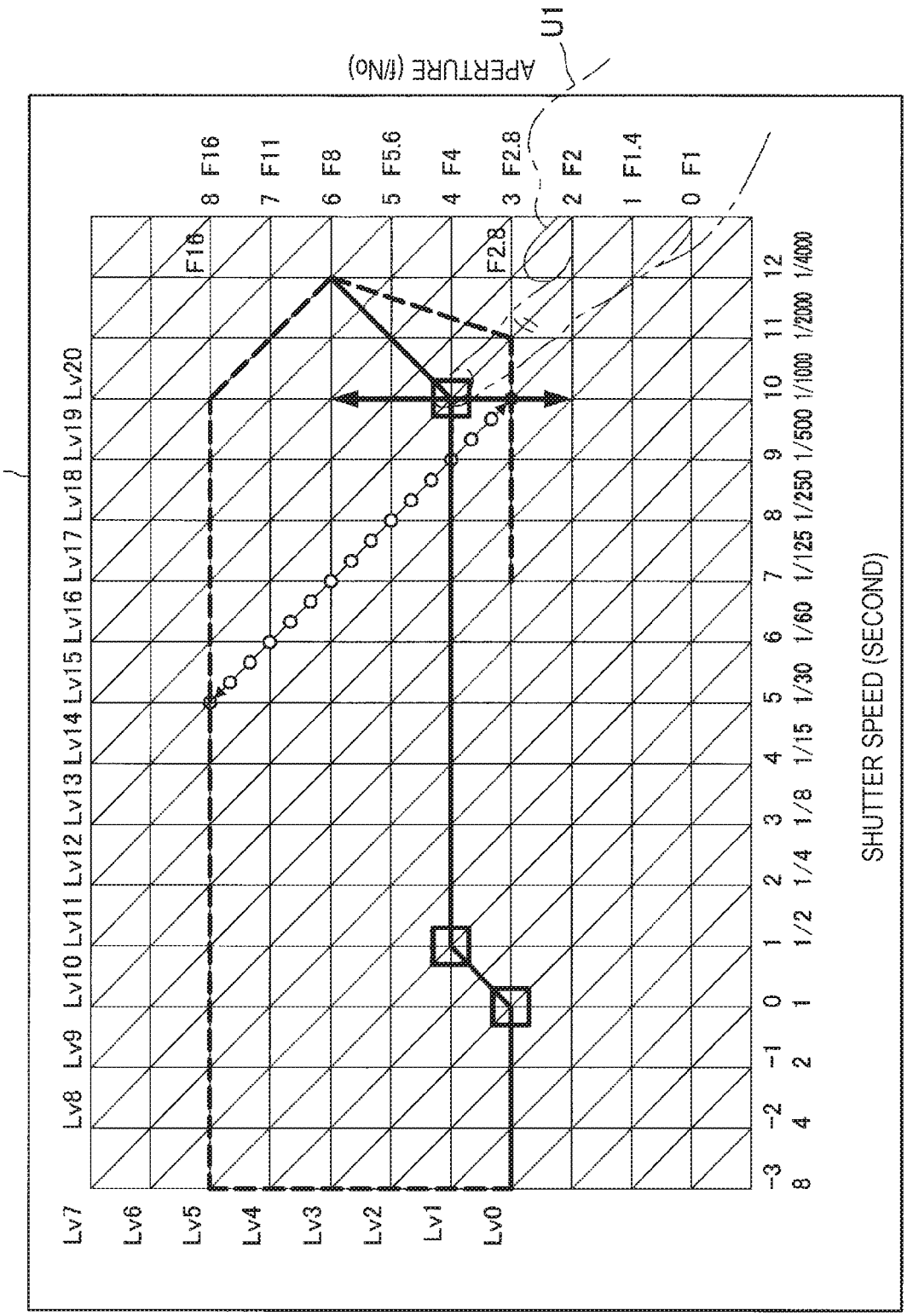
FIG. 8 is an explanatory diagram illustrating a state in which a user performs an operation of ending a change of setting of a program chart.

When causing the user to change the setting of the program chart, the image processing apparatus 100 may cause the user to designate a plurality of changing points of the program chart. FIG. 8 is an explanatory diagram illustrating a state in which the user performs an operation of ending the change of the setting of the program chart. FIG. 8 illustrates a state in which the user is caused to designate a plurality of changing points of the program chart, when the user is caused to change the setting of the program chart.

When visually changing the setting of the program chart in accordance with an operation of the user, the image processing apparatus 100 may make distinguishable an amount of change from a preset setting of the program chart. For example, the image processing apparatus 100 may display a preset setting of the program chart using a broken line, and display the setting of the program chart that has been changed in accordance with the operation of the user, using a solid line.

Settable ranges of a shutter speed and an aperture value can vary depending on a lens provided in the imaging unit 102. In addition, in the case of a telescopic lens, a settable range of an aperture value can vary also depending on a focal length. For example, in the case of a telescopic lens having a maximum aperture value of F4.5 in a case Where a focal length is 70 mm, but having a maximum aperture value of F5.6 in a case where a focal length is 300 mm, it is impossible to set an aperture value to F4.5 if the focal length is set to 300 mm. Thus, the image processing apparatus 100 may clearly indicate settable ranges of a shutter speed and an aperture in a program chart in accordance with characteristics of a lens provided in the imaging unit 102. In addition, the image processing apparatus 100 may clearly indicate settable ranges of a shutter speed and an aperture in a program chart in accordance with a state of a lens provided in the imaging unit 102.

For example, in such a case where a certain lens has a maximum aperture value of F1.4, but another lens has a maximum aperture value of F2.8, when the lens having the maximum aperture value of F1.4 is provided in the imaging unit 102, when visually changing the setting of the program chart in accordance with an operation of the user, the image processing apparatus 100 may enable an aperture value to be designated up to F1.4 in an open direction. On the other hand, when the lens having the maximum aperture value of F2.8 is provided in the imaging unit 102, when visually changing the setting of the program chart in accordance with an operation of the user, the image processing apparatus 100 may enable an aperture value to be designated up to F2.8 in the open direction, and draw a program chart such that a region with an aperture value opened more than F2.8 is painted with a color indicating that designation cannot be performed, such as black or gray.

In addition, for example, in a case where a telescopic lens having a maximum aperture value of F4.5 in a case where a focal length is 70 mm, but having a maximum aperture value of F5.6 in a case where a focal length is 300 mm is provided in the imaging unit 102, when the focal length of the lens is 70 mm, when visually changing the setting of the program chart in accordance with an operation of the user, the image processing apparatus 100 may enable an aperture value to be designated up to F4.5 in the open direction. On the other hand, when the focal length of the lens provided in the imaging unit 102 is 300 mm, when visually changing the setting of the program chart in accordance with an operation of the user, the image processing apparatus 100 may enable an aperture value to be designated up to F5.6 in the open direction, and draw a program chart such that a region with an aperture value opened more than F5.6 is painted with a color indicating that designation cannot be performed, such as black or gray.

The image processing apparatus 100 can enlarge or reduce the display of the program chart on the display unit 110, in accordance with a predetermined operation of the user. Examples of operations of enlarging the program chart can include a pinch-out operation on the display unit 110, and an operation for enlarging that is provided in the input unit 106, and examples of operations of reducing the program chart can include a pinch-in operation on the display unit 110, and an operation for reducing that is provided in the input unit 106.

The image processing apparatus 100 may save the program chart having the setting changed by the user, into the storage unit 108, or save the program chart into an external device via the communication unit 112. The image processing apparatus 100 may automatically save the program chart, or may save the program chart in accordance with a predetermined operation of the user. When saving the program chart, the image processing apparatus 100 may save the program chart together with information regarding a current position, information regarding a direction, and the like. In addition, when saving the program chart having the setting changed by the user, the image processing apparatus 100 may save the entire settings, or may save only a difference from a pre-change setting of the program chart.

In addition, the image processing apparatus 100 may read out a saved program chart in accordance with a predetermined operation of the user. In addition, when reading out a program chart, the image processing apparatus 100 may decide a program chart to be read out, using information regarding a current position of the image processing apparatus 100 and information regarding a direction of the image processing apparatus 100. If information regarding a position and a direction of the image processing apparatus 100 that has set a program chart is saved together with information regarding the program chart, the image processing apparatus 100 can read out a program chart that corresponds to or is similar to the information regarding the position and the direction. When reading out a program chart, by deciding a program chart to be read out, using the information regarding the current position of the image processing apparatus 100 and the information regarding the direction of the image processing apparatus 100, it becomes possible for the image processing apparatus 100 to cause the user to use a program chart set by another user, as a reference of image capturing.

The image processing apparatus 100 may change a settable range of a parameter that can be set by a program chart, in accordance with an image capturing mode set at the time of image capturing. The image capturing mode is provided for automatically setting parameters such as an aperture, a shutter speed, an ISO sensitivity, white balance, color tone, saturation, with or without face recognition, with or without electronic flash emission, and with or without slow synchronization, in accordance with a subject of image capturing or a situation at the time of image capturing, when an image of the subject is captured using the image processing apparatus 100.

For example, in a case where the user has selected, as an image capturing mode, a mode suitable for image capturing of a person, an image in which a person stands out can be captured by setting an aperture to be more opened. Thus, the image processing apparatus 100 may change a settable range of a parameter that can be set by a program chart, such that an open direction can be designated more as compared with another mode (such that a stopped-down direction cannot be designated).

A program chart can be set for each ISO sensitivity. This is because image capturing can be performed at a high shutter speed if an ISO sensitivity is increased even though an aperture value remains the same. Thus, when displaying a program chart, the image processing apparatus 100 may display, on the display unit 110, settings obtainable at adjacent ISO sensitivities (e.g., ISO sensitivities adjacent to an ISO sensitivity 200 are assumed to be ISO sensitivities 100 and 400.), so as to be superimposed on the program chart. When displaying the settings obtainable at adjacent ISO sensitivities, so as to be superimposed on the program chart, the image processing apparatus 100 may display the settings so as to make the settings easily-understandable as the settings obtainable at the adjacent ISO sensitivities, by varying a line type.

In addition, in the case of displaying, on the display unit 110, the settings of adjacent ISO sensitivities so as to be superimposed on the program chart, the image processing apparatus 100 may enable an operation of the program chart at the adjacent ISO sensitivities, in response to the user touching, with a finger or the like, the settings at the adjacent ISO sensitivities.

For example, the aforementioned setting of the program chart may be performed by a mobile terminal such as a smartphone or a tablet terminal that performs an image capturing instruction in cooperation with a camera. For example, a mobile terminal that displays an image captured by a camera may display a program chart on a screen in accordance with an operation of the user, and perform processing of changing the setting of the program chart.

Figure 9:
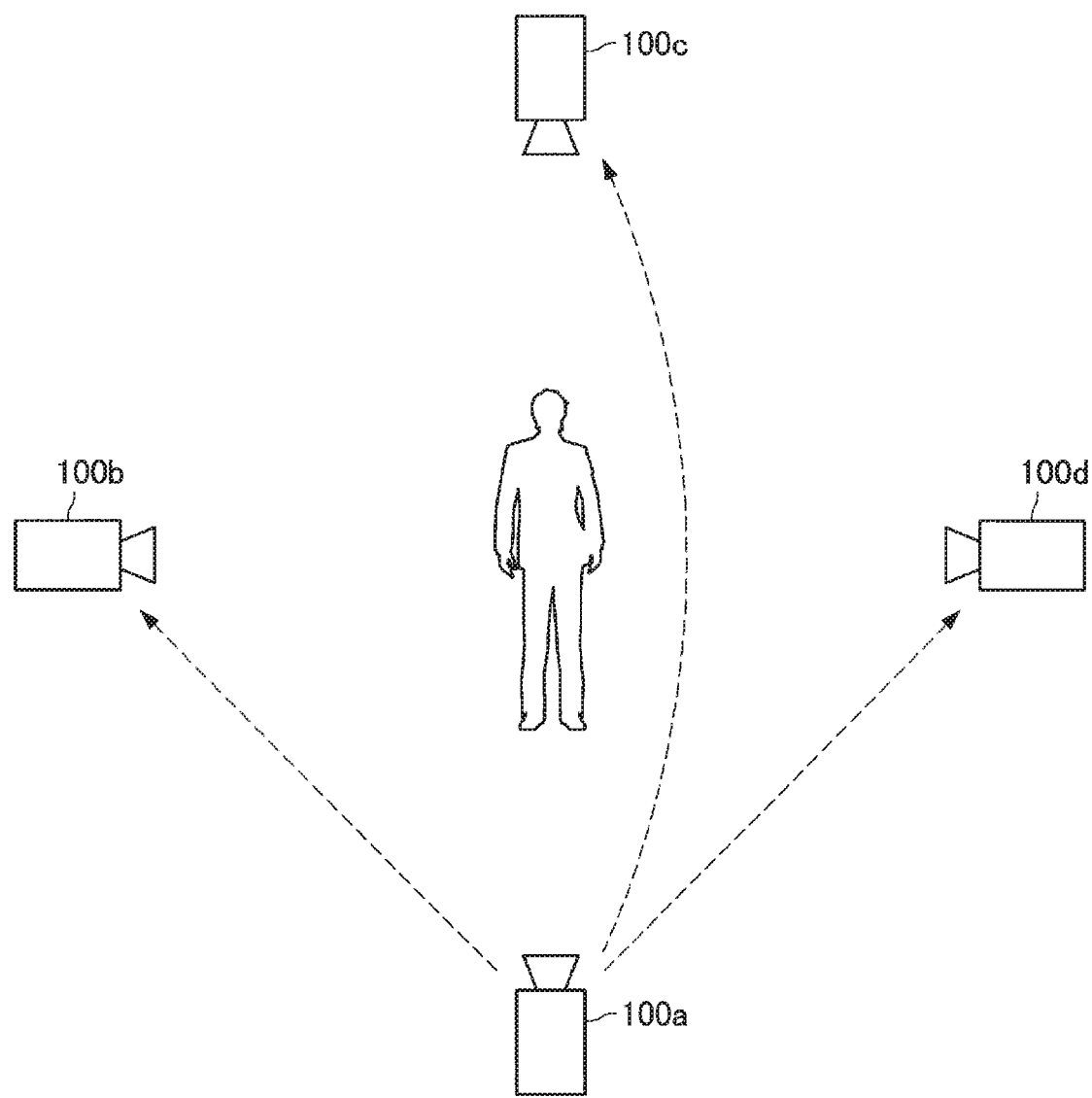
FIG. 9 is an explanatory diagram illustrating an example of a state in which four image processing apparatuses 100a to 100d are capturing images of the same subject.

When images of the same subject are captured using a plurality of image processing apparatuses 100, the setting of a program chart may be interlocked with the other image processing apparatuses 100. FIG. 9 is an explanatory diagram illustrating an example of a state in which four image processing apparatuses 100a to 100d are capturing images of the same subject. Here, when the image processing apparatus 100a displays a program chart on the display unit 110 in accordance with an operation of the user, and changes the setting of the program chart, the image processing apparatus 100a may transmit information regarding the program chart, to the other image processing apparatuses 100b to 100d.

In this manner, by interlocking information regarding a program chart, between apparatuses, when images of the same subject are captured using a plurality of image processing apparatuses 100, image capturing can be performed using the same setting.

On the basis of a predetermined operation of the user, the image processing apparatus 100 may restore the setting of the program chart that has been changed by the user, to a preset state or a state immediately after readout. Examples of the predetermined operation for restoring the setting of the program chart that has been changed by the user, to a preset state or a state immediately after readout can include touching or approaching to an icon for initialization that is displayed on the display unit 110, an operation of a button for initialization that is included in the input unit 106, and the like.

All of the program charts used in the aforementioned description illustrate a relationship between a shutter speed and an aperture, but the present disclosure is not limited to this example. For example, a program chart that describes a relationship between a shutter speed and an ISO sensitivity may become a target to be changed in accordance with an operation of the user.

<2. Conclusion>

As described above, according to an embodiment of the present disclosure, there is provided the image processing apparatus 100 that changes the content of a program chart that consecutively describes a relationship between a shutter speed and an aperture, in accordance with a predetermined operation of the user, and changes the setting of the relationship between the shutter speed and the aperture in accordance with the change in the content of the program chart.

For example, in a case where the image processing apparatus 100 performs image capturing by automatically setting a shutter speed and an aperture, the setting is assumed to be made such that the image capturing is performed using an aperture of F5.6 in a case where the shutter speed is 1/500 seconds. At this time, when the user who desires to perform image capturing using a more opened aperture performs, on a program chart displayed on the display unit 110, an operation of changing a parameter so as to perform image capturing using an aperture of F4, in a case where the shutter speed is 1/500 seconds, for example, it become possible for the image processing apparatus 100 to perform image capturing using an aperture being opened to F4, in a case where the shutter speed is 1/500 seconds.

It may not be necessary to chronologically execute respective steps in the processing, which is executed by each device of this specification, in the order described in the sequence diagrams or the flow charts. For example, the respective steps in the processing which is executed by each device may be processed in the order different from the order described in the flow charts, and may also be processed in parallel.

Furthermore, it becomes possible to generate a computer program which makes a hardware device, such as a CPU, a ROM, and a RAM incorporated in each device demonstrate the functions equivalent to the configurations of the above described devices. In addition, it becomes also possible to provide a storage medium which stores the computer program. In addition, respective functional blocks shown in the functional block diagrams may be constituted from hardware devices or hardware circuits so that a series of processes may be implemented by the hardware devices or hardware circuits.

In addition, some or all of the functional blocks shown in the functional block diagrams used in the above description may be implemented by a server device that is connected via a network, for example, the Internet. In addition, configurations of the functional blocks shown in the functional block diagrams used in the above description may be implemented in a single device or may be implemented in a system in which a plurality of devices cooperate with one another. The system in which a plurality of devices cooperate with one another may include, for example, a combination of a plurality of server devices and a combination of a server device and a terminal device.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, an input device on which the user performs an operation on a program chart may be a device worn by the user, such as a glasses-type wearable device or a head mounted display (HMD), and various inputs may be performed on the program chart in accordance with a gesture and a visual line of the user that are detected by these devices. In addition, an input device on which the user performs an operation on a program chart may be a camera that can detect a motion of the user. Various inputs can be performed on the program chart in accordance with a gesture and a visual line of the user that are detected from a video captured by the camera. In addition, an input device on which the user performs an operation on a program chart may be a microphone that can collect voice of the user. Various inputs can be performed on the program chart by a sound via the microphone.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An imaging control apparatus including:
a control unit configured to change a display that consecutively describes a relationship between parameters of two or more image capturing conditions, in accordance with an operation performed by a user, and to change a setting of the relationship in accordance with a change of the display.

(2)

The imaging control apparatus according to (1), in which the consecutively-described display is a linear shape.

(3)

The imaging control apparatus according to (2), in which the control unit designates a changing point of the linear shape in accordance with the operation, and changes a position of the changing point.

(4)

The imaging control apparatus according to any one of (1) to (3), in which the control unit changes a relationship between parameters of the two or more image capturing conditions that are obtainable at a predetermined sensitivity.

(5)

The imaging control apparatus according to (4), in which the two or more image capturing conditions are a shutter speed and an aperture that are obtainable at the predetermined sensitivity.

(6)

The imaging control apparatus according to (4) or (5), in which the control unit controls the display so as to together display a relationship between parameters of the two or more image capturing conditions that are obtainable at another sensitivity.

(7)

The imaging control apparatus according to any one of (1) to (6), in which an operation performed by the user is touching or approaching of an operation member to the display.

(8)

The imaging control apparatus according to any one of (1) to (7), in which the control unit controls the display in accordance with a characteristic of a lens used at a time of image capturing.

(9)

The imaging control apparatus according to (8), in which the control unit controls the display so as to distinguish a region including a parameter that cannot be set with the characteristic of the lens, from another region.

(10)

The imaging control apparatus according to (8), in which the control unit imposes a restriction on a change of the display such that a parameter that cannot be set with the characteristic of the lens cannot be designated.

(11)

The imaging control apparatus according to any one of (8) to (10), in which the characteristic of the lens is a maximum aperture value.

(12)

The imaging control apparatus according to (11), in which the characteristic of the lens is a maximum aperture value decided in accordance with a focal length.

(13)

The imaging control apparatus according to any one of (1) to (12), in which the control unit controls the display in accordance with a mode used at a time of image capturing.

(14)

The imaging control apparatus according to any one of (1) to (13), in which the control unit selects the display on a basis of position information obtained at a time of image capturing.

(15)

The imaging control apparatus according to any one of (1) to (14), in which the control unit clearly indicates an amount of change from a default setting of the display changed in accordance with the operation.

(16)

An imaging control method including:
changing a display that consecutively describes a relationship between parameters of two or more image capturing conditions, in accordance with an operation performed by a user, and changing a setting of the relationship in accordance with a change of the display.

(17)

A computer program for causing a computer to execute:
changing a display that consecutively describes a relationship between parameters of two or more image capturing conditions, in accordance with an operation performed by a user, and changing a setting of the relationship in accordance with a change of the display.

REFERENCE SIGNS LIST 100 image processing apparatus
102 imaging unit
104 sensor unit
106 input unit
108 storage unit
110 display unit
112 communication unit
116 bus
118 control unit

The invention claimed is:
1. An imaging control apparatus comprising:
a control unit configured:
to change a display that consecutively describes a relationship between parameters of two or more image capturing conditions, in accordance with an operation performed by a user to specify a first image capturing condition of the two or more image capturing conditions and, independent of the specified first image capturing condition, to specify a second image capturing condition of the two or more image capturing conditions, and to change a setting of the relationship in accordance with a change of the display.

2. The imaging control apparatus according to claim 1, wherein the consecutively-described display is a linear shape.

3. The imaging control apparatus according to claim 2, wherein the control unit designates a changing point of the linear shape in accordance with the operation, and changes a position of the changing point.

4. The imaging control apparatus according to claim 1, wherein the control unit changes a relationship between parameters of the two or more image capturing conditions that are obtainable at a predetermined sensitivity.

5. The imaging control apparatus according to claim 4, wherein the two or more image capturing conditions are a shutter speed and an aperture that are obtainable at the predetermined sensitivity.

6. The imaging control apparatus according to claim 4, wherein the control unit controls the display so as to together display a relationship between parameters of the two or more image capturing conditions that are obtainable at another sensitivity.

7. The imaging control apparatus according to claim 1, wherein an operation performed by the user is touching or approaching of an operation member to the display.

8. The imaging control apparatus according to claim 1, wherein the control unit controls the display in accordance with a characteristic of a lens used at a time of image capturing.

9. The imaging control apparatus according to claim 8, wherein the control unit controls the display so as to distinguish a region including a parameter that cannot be set with the characteristic of the lens, from another region.

10. The imaging control apparatus according to claim 8, wherein the control unit imposes a restriction on a change of the display such that a parameter that cannot be set with the characteristic of the lens cannot be designated.

11. The imaging control apparatus according to claim 8, wherein the characteristic of the lens is a maximum aperture value.

12. The imaging control apparatus according to claim 11, wherein the characteristic of the lens is a maximum aperture value decided in accordance with a focal length.

13. The imaging control apparatus according to claim 1, wherein the control unit controls the display in accordance with a mode used at a time of image capturing.

14. The imaging control apparatus according to claim 1, wherein the control unit selects the display on a basis of position information obtained at a time of image capturing.

15. The imaging control apparatus according to claim 1, wherein the control unit clearly indicates an amount of change from a default setting of the display changed in accordance with the operation.

16. An imaging control method comprising:

changing a display that consecutively describes a relationship between parameters of two or more image capturing conditions, in accordance with an operation performed by a user to specify a first image capturing condition of the two or more image capturing conditions, and independent of the specified first image capturing condition, to specify a second image capturing condition of the two or more image capturing conditions; and changing a setting of the relationship in accordance with a change of the display.

17. A non-transitory computer-readable medium storing instructions that, when executed by a processor of a computer, cause the computer to execute operations comprising:

changing a display that consecutively describes a relationship between parameters of two or more image capturing conditions, in accordance with an operation performed by a user to specify a first image capturing condition of the two or more image capturing conditions, and independent of the specified first image capturing condition, to specify a second image capturing condition of the two or more image capturing conditions; and changing a setting of the relationship in accordance with a change of the display.

* * * * *